(12) United States Patent
McIntosh

(10) Patent No.: US 8,607,681 B2
(45) Date of Patent: *Dec. 17, 2013

(54) HAND-HELD BAND SAW

(75) Inventor: Scott McIntosh, Wixom, MI (US)

(73) Assignee: Persawvere, Inc., Livonia, MI (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/857,772

(22) Filed: Sep. 19, 2007

(65) Prior Publication Data

US 2008/0000093 A1  Jan. 3, 2008

Related U.S. Application Data

(62) Division of application No. 10/776,838, filed on Feb. 11, 2004, now Pat. No. 7,287,454.

(60) Provisional application No. 60/448,295, filed on Feb. 19, 2003.

(51) Int. Cl.
 *B23D 53/12* (2006.01)

(52) U.S. Cl.
 USPC .................................. 83/788; 83/820; 30/380

(58) Field of Classification Search
 USPC ............ 83/788, 816, 820, 454, 473.3; 30/380
 See application file for complete search history.

(56) References Cited

U.S. PATENT DOCUMENTS

| | | | |
|---|---|---|---|
| D156,282 S * | 11/1949 | Schepige | D15/134 |
| 2,596,081 A | 5/1952 | Sacrey | |
| 2,876,809 A * | 3/1959 | Rentsch et al. | 30/380 |
| 3,829,970 A | 8/1974 | Anderson | |
| 3,958,332 A | 5/1976 | Gates et al. | |
| 3,961,550 A | 6/1976 | Oliver et al. | |
| 4,001,937 A | 1/1977 | Stelljes et al. | |
| 4,141,142 A | 2/1979 | Karubian | |
| 4,160,320 A | 7/1979 | Wikoff | |
| 4,193,192 A | 3/1980 | Cortez | |
| 4,212,104 A | 7/1980 | Wikoff | |
| 4,242,798 A | 1/1981 | Wikoff | |
| 4,386,545 A | 6/1983 | Chaconas | |
| 4,413,414 A | 11/1983 | Strzalka | |
| 4,449,271 A | 5/1984 | Karubian | |
| 4,502,184 A | 3/1985 | Karubian | |
| 4,677,887 A | 7/1987 | Martin | |
| 4,823,666 A | 4/1989 | Galloway | |
| 4,841,639 A * | 6/1989 | Graney | 30/380 |
| 4,953,295 A | 9/1990 | Barradas et al. | |
| 5,272,946 A | 12/1993 | McCullough et al. | |
| 6,161,293 A * | 12/2000 | Watson | 30/377 |
| 6,256,891 B1 | 7/2001 | Van Camp et al. | |
| 6,442,848 B1 | 9/2002 | Dean | |
| 6,523,447 B2 | 2/2003 | Judge | |

(Continued)

FOREIGN PATENT DOCUMENTS

JP   2000042949   2/2000

*Primary Examiner* — Omar Flores Sanchez

(74) *Attorney, Agent, or Firm* — Cargill & Associates, PLLC; Lynn E. Cargill

(57) ABSTRACT

A hand-held band saw is provided for one-hand operation. The band saw has a frame and a handle extending from a longitudinal edge of the frame at an acute angle and opposite an edge containing a throat for receiving the work piece. The orientation of the handle centers the mass of the saw below the hand and positions the cutting section of the blade in a vertical plane so it will engage a work piece at a preferred angle selected by the user.

13 Claims, 8 Drawing Sheets

(56) References Cited

U.S. PATENT DOCUMENTS

| | | |
|---|---|---|
| 6,675,486 B2 | 1/2004 | Falberg |
| 6,775,913 B2 * | 8/2004 | Fey et al. .................. 30/388 |
| 6,829,830 B2 | 12/2004 | O'Banion |
| 6,996,909 B1 * | 2/2006 | Buck et al. ................. 30/388 |
| D522,828 S | 6/2006 | Brazell et al. |
| D530,580 S | 10/2006 | Hayakawa et al. |
| 2002/0040530 A1 | 4/2002 | Crawley |
| 2002/0157264 A1 | 10/2002 | Falberg |
| 2003/0188440 A1 | 10/2003 | Dean |
| 2004/0158996 A1 * | 8/2004 | McIntosh .................. 30/380 |
| 2005/0188550 A1 * | 9/2005 | Uehlein-Proctor et al. .... 30/380 |

* cited by examiner

HAND-HELD BAND SAW

CROSS-REFERENCE TO RELATED APPLICATIONS

This application is a divisional application of U.S. Utility Application Ser. No. 10/776,838 filed Feb. 11, 2004, which claims the benefit of U.S. Provisional Patent Application Ser. No. 60/448,295, filed on Feb. 19, 2003, which are herein incorporated by reference in their entirety.

FIELD OF THE INVENTION

This invention concerns hand-held power tools and particularly an improved cut-off or band saw designed for one-handed operation.

BACKGROUND

Vertical band saws were traditionally the tool of choice for cutting conduit, pipe and a variety of other materials. However, the size of such saws make it difficult to easily transport vertical band saws to the job site. As a result, portable band saws were designed for use on the job site by electricians and pipe fitters. The portable band saw design, exemplified in U.S. Pat. No. 4,001,937, is still a substantial piece of equipment and requires two-handed operation to support the saw above the work piece. As a result of the two-handed operation, and the weight of the tool, operators often find themselves standing in awkward and physically detrimental positions to make the appropriate cut. The manner in which the saw needs to be manipulated requires the work piece be fixed in some manner such as by clamp or vise. This process is sometimes cumbersome because of the length or weight of the stock and also results in lower back injuries because of the awkward posture in making the cut.

The instant invention overcomes all of the disadvantages of the prior portable band saw designs since the invention is lightweight, can be easily held in one hand, and is balanced so as not to require awkward postures in operation.

SUMMARY OF THE INVENTION

It is a purpose of this invention to provide a user a lightweight and portable band saw for cutting materials traditional cut by hand using a hack saw.

It is another purpose of this invention to provide a user with a portable band saw that can comfortably be held and operated with a single hand so the other hand can control the stock being cut.

It is another object of this invention to provide a portable band saw that naturally orients the cutting section of the blade in a plane normal to the work piece to make a clean cut.

It is another object of this invention to provide a band saw with a safety feature that breaks a blade before it can be dangerous and injure the user.

In furtherance of the objects and goals of the invention, a hand-held band saw is provided for cutting a work piece. The band saw includes in its most rudimentary form a frame assembly having a handle assembly extending at an acute angle from a longitudinal edge of the frame assembly. The frame assembly receives a motor assembly proximate one end, having a shaft extending through the frame assembly. A drive wheel is connected to the free end of the shaft. A driven wheel is mounted on the frame assembly distant from the drive wheel and together supports a continuous loop cutting blade.

According to another form of the invention, a hand-held band saw is provided including a deck and a handle extending from a longitudinal edge of the deck at an acute angle. The deck also provides a base for a motor assembly at one end connected to a drive wheel and a tensioning member at an opposite end of the deck and connected to a driven wheel. A continuous loop blade is mounted to the drive and driven wheels with a section of the cutting blade deflected at an angle about equal to the acute angle of the handle so the user can better align the continuous loop blade to make the cut.

According to yet another object of the invention, the hand-held band saw includes a frame assembly, a handle assembly extending at an acute angle from a longitudinal edge of the frame assembly, a motor assembly mounted to the frame assembly and connected to a drive wheel, a driven wheel connected to a tensioning assembly, and a battery pack detachably coupled to an end of the handle assembly distant from the motor assembly to provide a balance feel to the user when the saw is grasped by the handle.

According to the other objects of the invention, the band saw includes a guide assembly attached to the frame assembly to orient a section of the blade at an angle approximating the acute angle of the handle.

Yet another form of the invention includes a hand-held band saw having a frame or chassis assembly and a cam assembly disposed within a portion of the frame or chassis assembly and connected to a driven wheel for allowing the driven wheel to move relative to the drive wheel.

In addition to one or more of the above features or aspects of the invention, a fence is provided for supporting the work piece and aiding in making an accurate cut. Moreover, appropriate gearing reduction is provided between the motor and the drive wheel to control the maximum rotation of the cutting blade.

In yet another embodiment of the invention, a method for operating a hand-held portable band saw is provided including grasping the band saw by a handle extending at an acute angle from a longitudinal edge of the saw frame, orienting a work piece to be cut by the saw, resting the work piece against a fence depending from a frame of the saw, and energizing the saw to cause the blade to cut through the work piece along a predetermined path.

The instant invention provides significant advantages of the prior band saws. Foremost is the ability to easily transport the band saw to any location. The weight of the saw is comparable to other single-handed operation tools rendering it easily carried on a belt or by hand. The form of the invention using a rechargeable battery as a source of power no longer requires an AC source. This aspect expands the range of operational environments. The instant invention also provides the advantage of saving time since it can be used at the very spot where the user is currently working. No longer does the user need to measure, mark, and transport the work piece to another location to have it cut. A unique feature of this method is the manner in which the saw body is automatically oriented at an acute angle relative to the handle to properly position the saw blade in a plane generally parallel to the plane of the handle to that the cut can be easily controlled by the user. Lastly, and perhaps most importantly, is the advantage the invention provides is the ability of the user to hold the saw in one hand in a balanced, naturally vertical orientation such the saw blade is oriented normal to the work piece. The orientation does not cause the user to assume irregular or awkward postures while cutting that could lead to back or other physical disorders. These and other advantages will become readily apparent when viewing the attached drawing figures described in greater detail in this specification.

BRIEF DESCRIPTION OF THE DRAWING FIGURES

DETAILED DESCRIPTION OF THE VARIOUS EMBODIMENTS

For purposes of the following description, the terms "upper," "lower," "left," "rear," "front," "vertical," "horizontal" and derivatives or formatives of such terms shall relate to the invention as oriented in each of the respective drawing figures. The invention may assume various alternative orientations and embodiments, except where expressly specified to the contrary. Moreover, the specific devices and processes illustrated in the attached drawings, and described in the following text, are simply one embodiment of the concept. Specific dimensions and other physical characteristics of the invention are not to be considered limiting unless expressly stated otherwise as being crucial. It is also the inventor's intention the terms "wheel," "pulley," "roller," or "rotary actuator" may be used interchangeably to refer to components capable of rotating, pivoting or swiveling, fully or partially, about a predetermined axis to convert rotary motion to linear motion to an associated or connected component.

Figure 1:
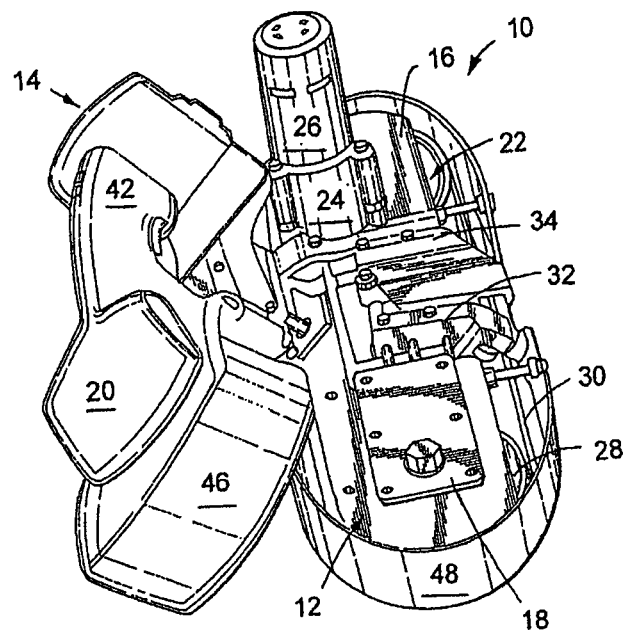
FIG. 1 is an oblique end view of a saw embodying the present invention.
Figure 2:
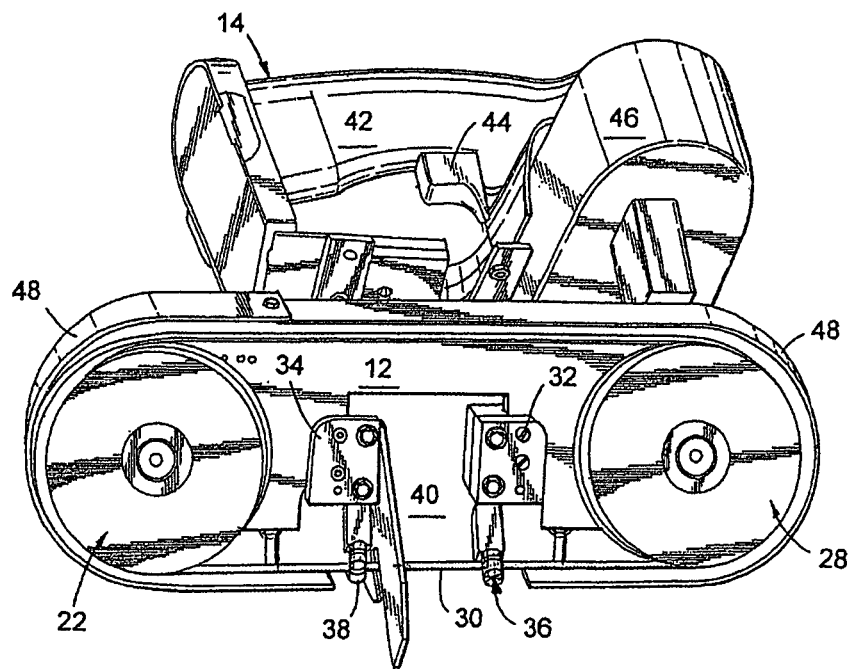
FIG. 2 is a bottom view of the invention shown on FIG. 1.
Figure 3:
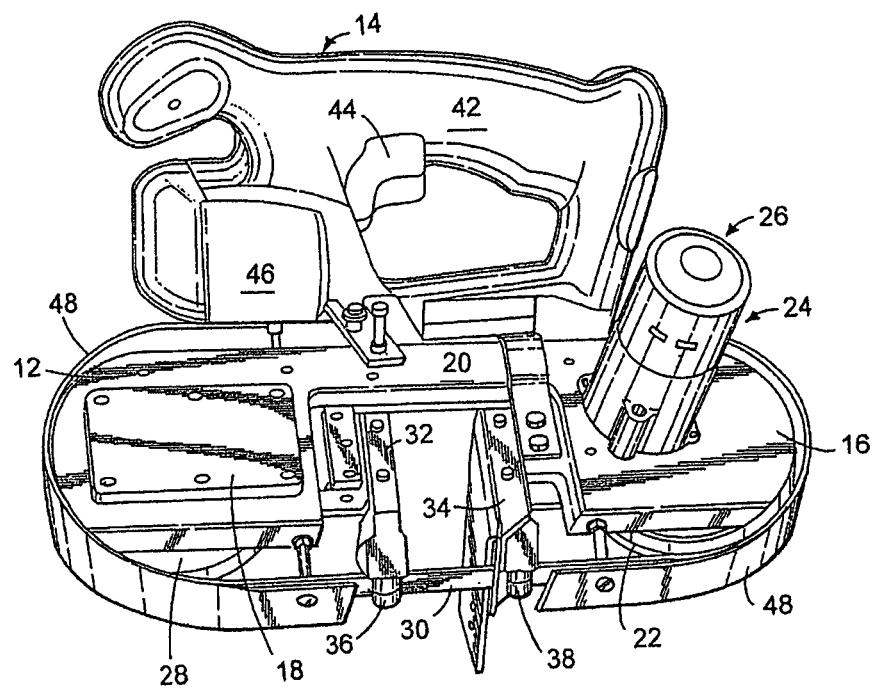
FIG. 3 is an oblique side of the invention shown on FIG. 1.
Figure 4:
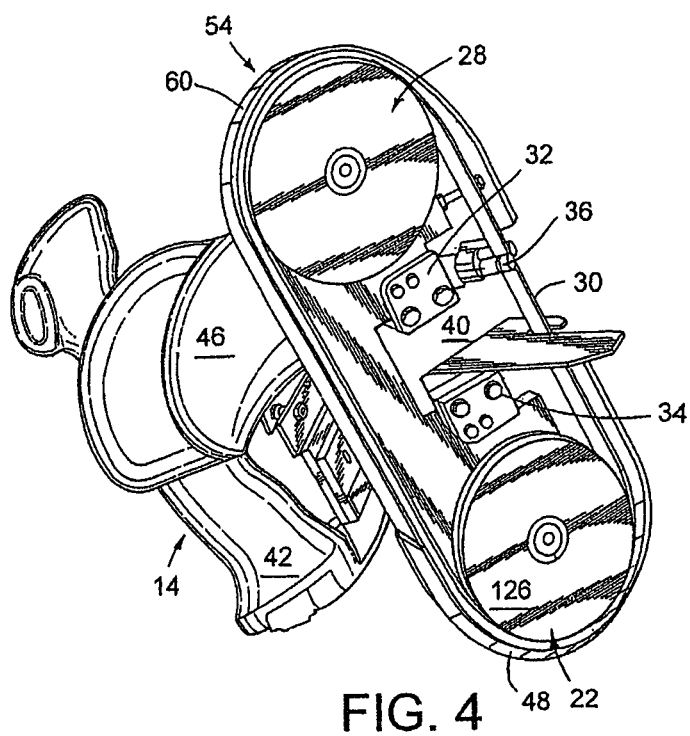
FIG. 4 is a perspective bottom view of the invention shown on FIG. 1.

One form of the inventive band saw 10 is illustrated in various orientations in FIGS. 1-4. The band saw 10 as shown is made from a variety of assembled components, including a C-shaped frame assembly 12 depending angularly from a centrally located handle assembly 14. FIGS. 1 and 2 best illustrate the location of the handle assembly 14 intermediate the extreme ends of the C-shaped frame assembly 12.

The frame assembly 12 includes a first end 16 interconnected to a second opposite end 18 by a laterally offset longitudinal member (LOLM) 20 which establishes the general framework for the out-off saw 10. Handle assembly 14 is connected to frame assembly 12 at various locations including the LOLM 20 and medial portions of the first end 16 such that the center of gravity of the cut-off saw 10 is disposed centrally below handle assembly 14.

Journaled to the underside of the first end 16 of frame assembly 12 is a drive pulley 22 of predetermined diameter coupled via a transmission 24 to an electric motor 26, both respectively shown extending from the upper surface of first end 16. A driven pulley 28 is journaled to the underside of the second end 18 of the frame assembly 12 by way of a tensioning assembly (not shown) mounted to the frame assembly 12. The tensioning assembly may take on any one of a number of configurations to translate driven pulley 28 relative to drive pulley 22 for retaining a continuous loop blade 30 mounted on pulleys 22 and 28.

Extending toward the parallel section of the continuous loop blade 30 opposite that of the LOLM 20, and mounted on the medial portions of end members 16 and 18, are brackets 32 and 34, respectively. Roller bearing assemblies 36 and 38 disposed at the end of each bracket 32, 34 are intended to engage opposing sides of blade 30 and cause the blade 30 to twist a predetermined angle relative to the tangent of the pulleys 22 and 28. Orienting that portion of the blade 30 in the "throat" area 40 between ends 16 and 18 provides the greatest cutting depth for the blade. A stop plate or fence 41 extends from bracket 34 for receiving the work piece and provides stability.

As briefly mentioned earlier, one of the advantages provided by the invention is the one-handed balanced operation. This is achieved by locating the handle intermediate the drive and driven pulleys 22, 28, respectively, rather than outboard as in previous designs. Moreover, it is intended to suspend the frame assembly 12 at a point below the handle assembly 14 such that the saw, under the effect of gravity, hangs naturally when gripped by the operator.

The handle assembly 14 includes a pistol grip 42 having a trigger assembly 44 for controlling the cutting speed of the motor 26. Integral with the grip 42 is a receptacle intended to slidably receive, or otherwise connect to a rechargeable battery pack 46, providing power to the motor 26 via the trigger. The location and dimension of the battery pack 46 is designed to offset and substantially balance the weight of the cantilevered components so the saw feels well balanced within the user's grip. Appropriate connections and locks are to be provided to receive and hold the battery pack 46 in place.

The cut-off saw 10 shown in the drawing figures illustrates a skirt 48 extending generally downward around the blade 30 and fastened at intervals to the frame assembly 12. In a preferred embodiment, the skirt extends substantially around the saw except around the portion of the blade traversing the throat area 40. Clearly, the absence of the skirt in this area permits the blade 30 to engage the work piece.

In a more sophisticated embodiment of the invention, it is contemplated the chassis including the frame assembly 12 and handle assembly 14 may be integrally formed from machined metal or molded polymeric material described in greater detail below. Likewise, the battery case and battery receptacle in the handle may be formed from a molded polymeric material. The protective covers surrounding the motor 26 as well as the undersides of the drive and driven pulleys 22, 28 may also be shrouded or enclosed by machined aluminum or molded polymeric covers. Of course, it is understood metallic or polymeric materials are not the only materials from which a majority of the cutoff saw components are manufactured. Certainly other materials such as bronze or other metals could be used to produce this invention.

FIGS. 5-9b illustrate yet another embodiment of the inventive cut-off saw manufactured using one of the aforementioned machining or molding techniques. In essence, the configuration of the embodiment of the cut-off saw 50 is substantially similar to that of the saw 10 described above. However, in this particular embodiment, the chassis 52 defined by the saw deck 54 and one half of the handle assembly 56 are formed as a unitary and integral unit as illustrated in FIG. 9a In one embodiment, the chassis 52 may be machined from a billet of aluminum. Preferably, the saw deck 54 and portion of the handle assembly 56 are formed by a process of plastic injection molding.

In this embodiment, the saw deck 54 in plan view has a substantially oval configuration defining a first end 58 and an opposite and second end 60. The deck assembly 54 includes a deck 62 having a generally C-shaped configuration wherein the gap along one margin or edge of the oval deck 62 forms a throat 64 for receiving the work piece. The deck 62 may be reinforced and made substantially rigid by the integral downwardly depending skirt 66 depending from the periphery of deck 62 as well as ribs, bulkheads or flanges 68 depending from the underside of deck 62 and around throat 64. In its most rudimentary form, the deck 62 includes a cylindrical motor mount 70 terminating in a floor 72 and breached by centrically disposed hole 74. The cylindrical mount 70 and associated structure is adapted to receive a motor assembly 76 described in greater detail below. Proximate the first end 58 of the deck 52 is a second recess 78 terminating in a floor 80 and having an oval hole 82 formed therein. The recess 78 is intended to receive a tensioning assembly generally identified by reference number 84 in FIG. 9a described in greater detail below.

In one embodiment, deck 62 and supporting structure may be manufactured from a polymeric material using plastic injection molding techniques. In this instance, rib and bulkheads may be formed as an integral part of the deck 62 to provide a rigid structure. In another embodiment as described above, the deck 62 may also be machined from aluminum or other metal.

Figure 9A:
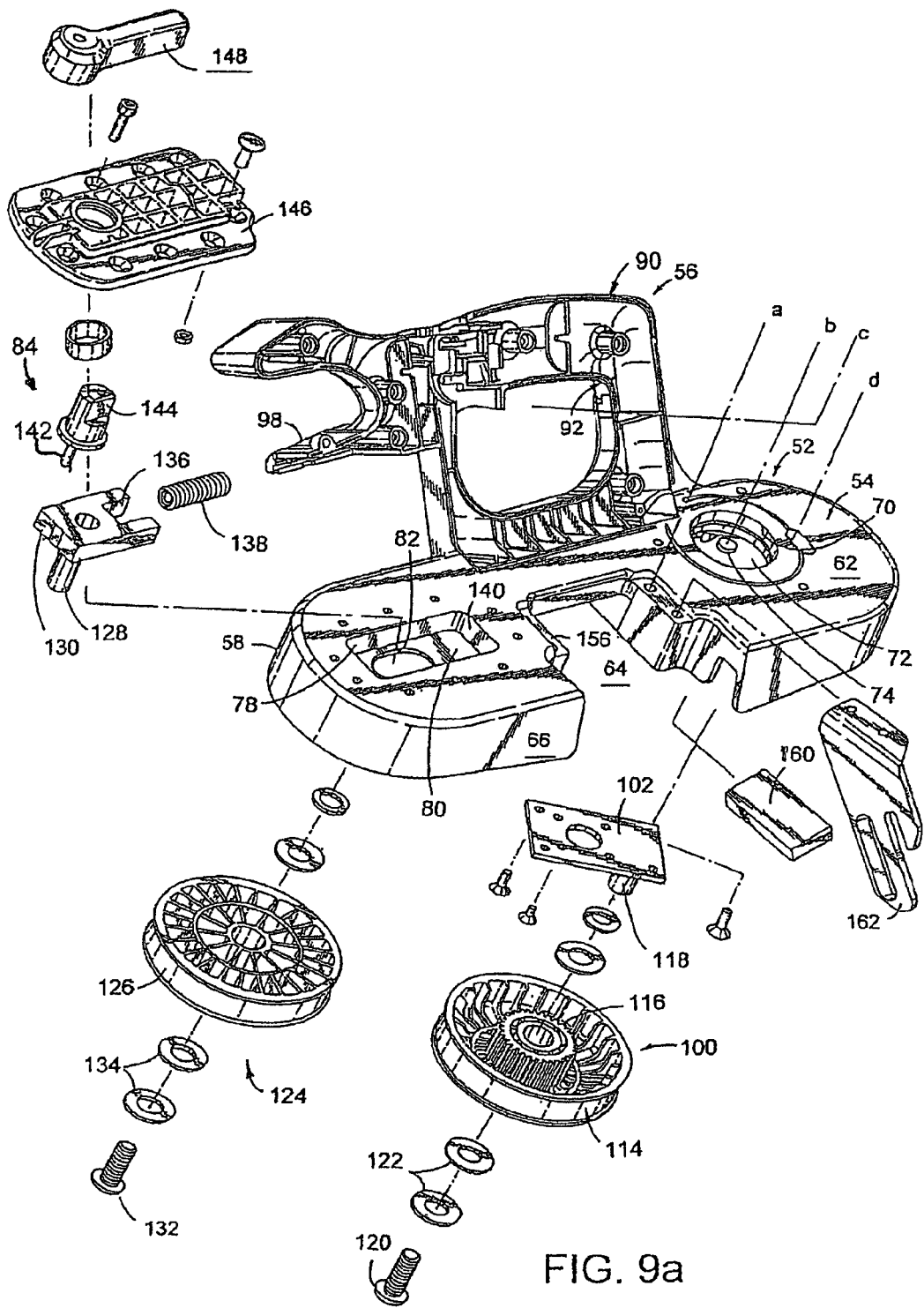
FIGS. 9a and 9b are exploded views of the invention shown in FIG. 5.
Figure 9B:
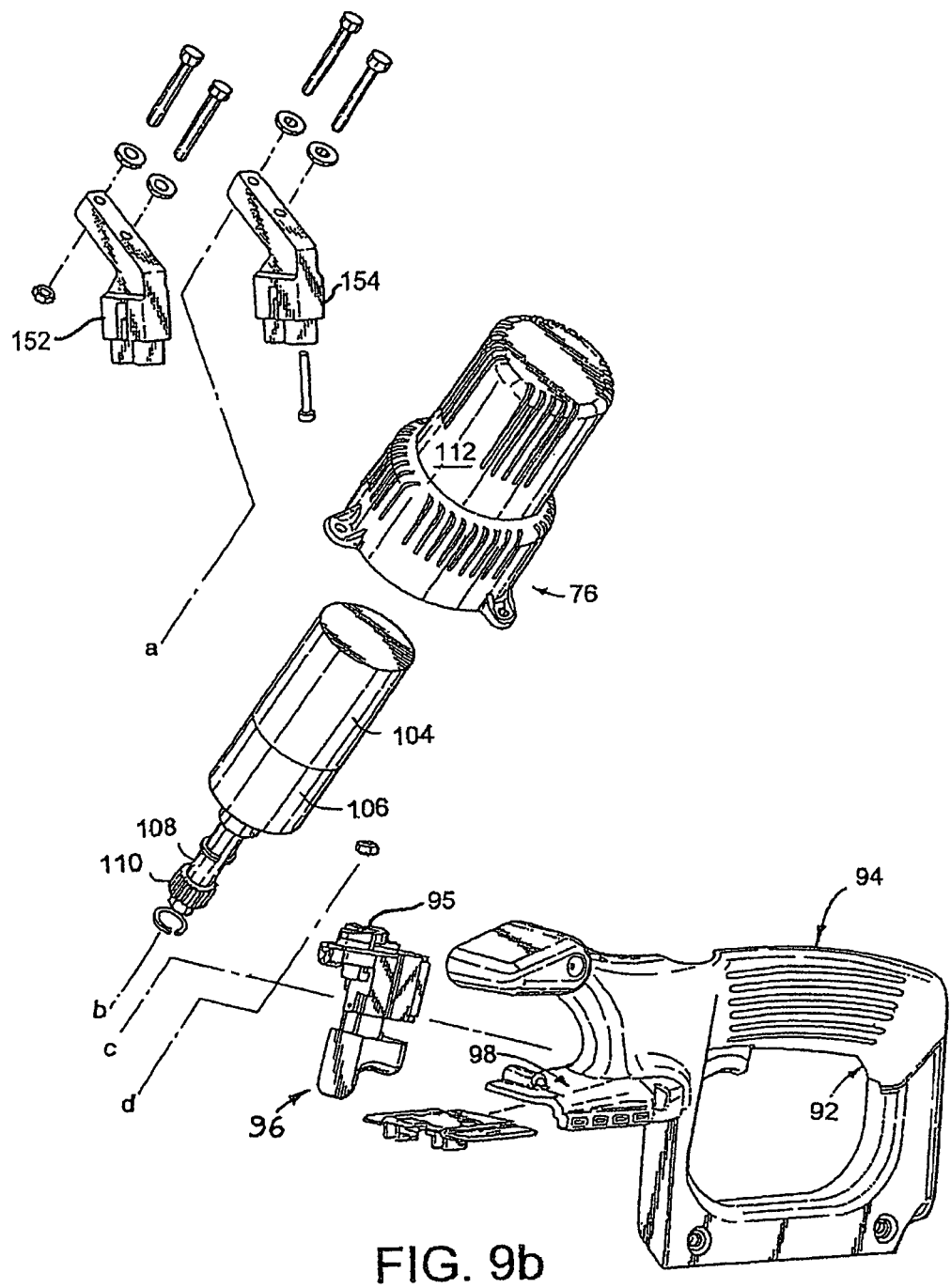

In the embodiment shown in FIGS. 9a and 9b, one half 90 or other fraction of a handle assembly 92 may be integrally formed with the chassis 52 or deck 62. The handle assembly 92 includes a mating handle shell 94 adapted to mate with handle portion 90. Using the same injection molding method contemplated in the preferred method, appropriate mounting surfaces and structures can be formed in the handle assembly 92 to receive a safety switch 95 and a variable speed trigger 96. In the preferred embodiment, handle assembly 92 is angled relative to deck 62. Most preferably, the plane normal or perpendicular to deck 62 is disposed at an acute angle to a plane substantially parallel to the handle assembly 92. With the handle in this orientation, the center of gravity of the saw is located below the handle and properly positions the saw blade parallel to the handle. In this way, the natural orientation of the user's hand greatly assists in providing better control of the cut.

Figure 5:
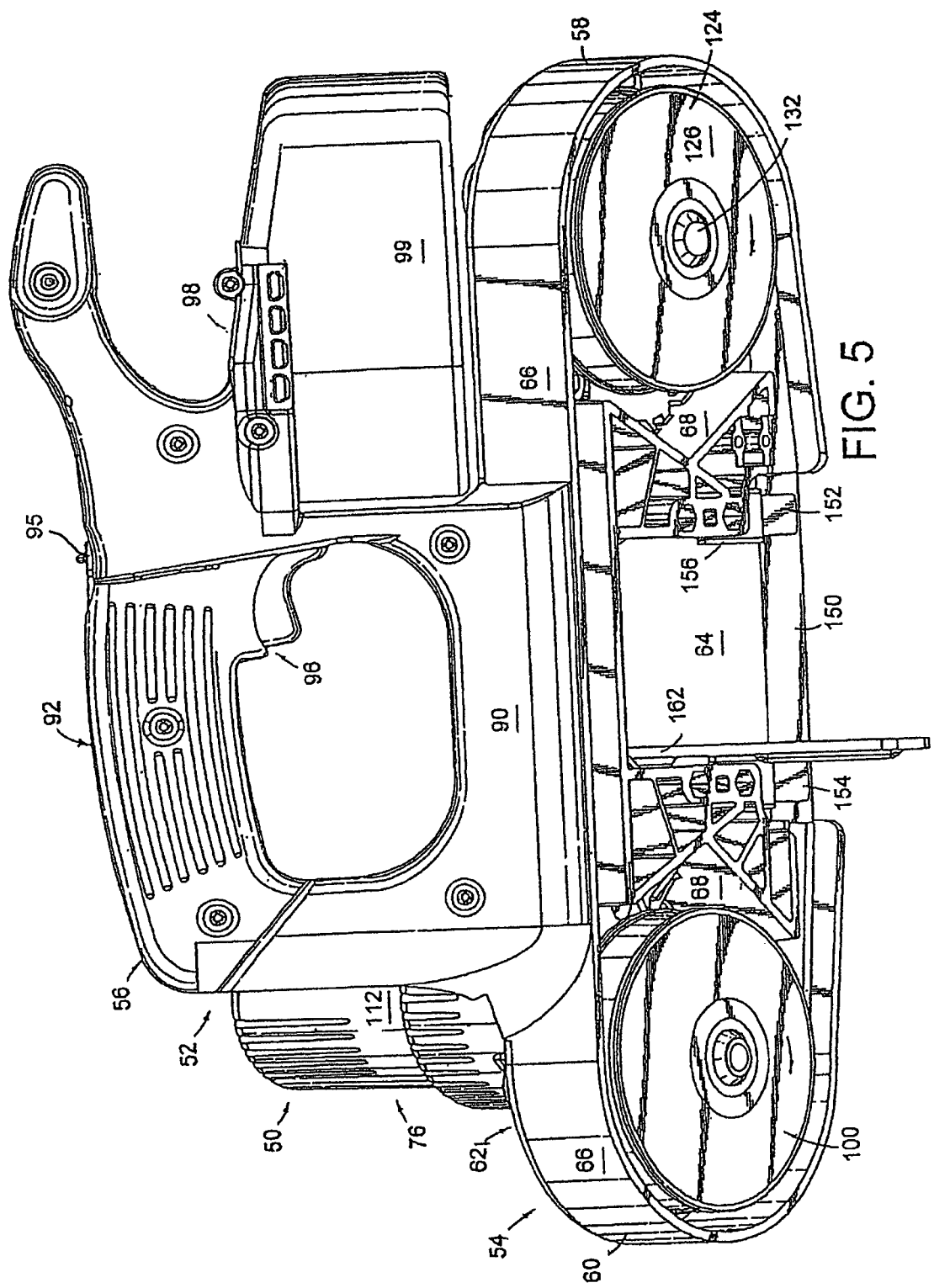
FIG. 5 is a side elevation view of another form of the invention.
Figure 6:
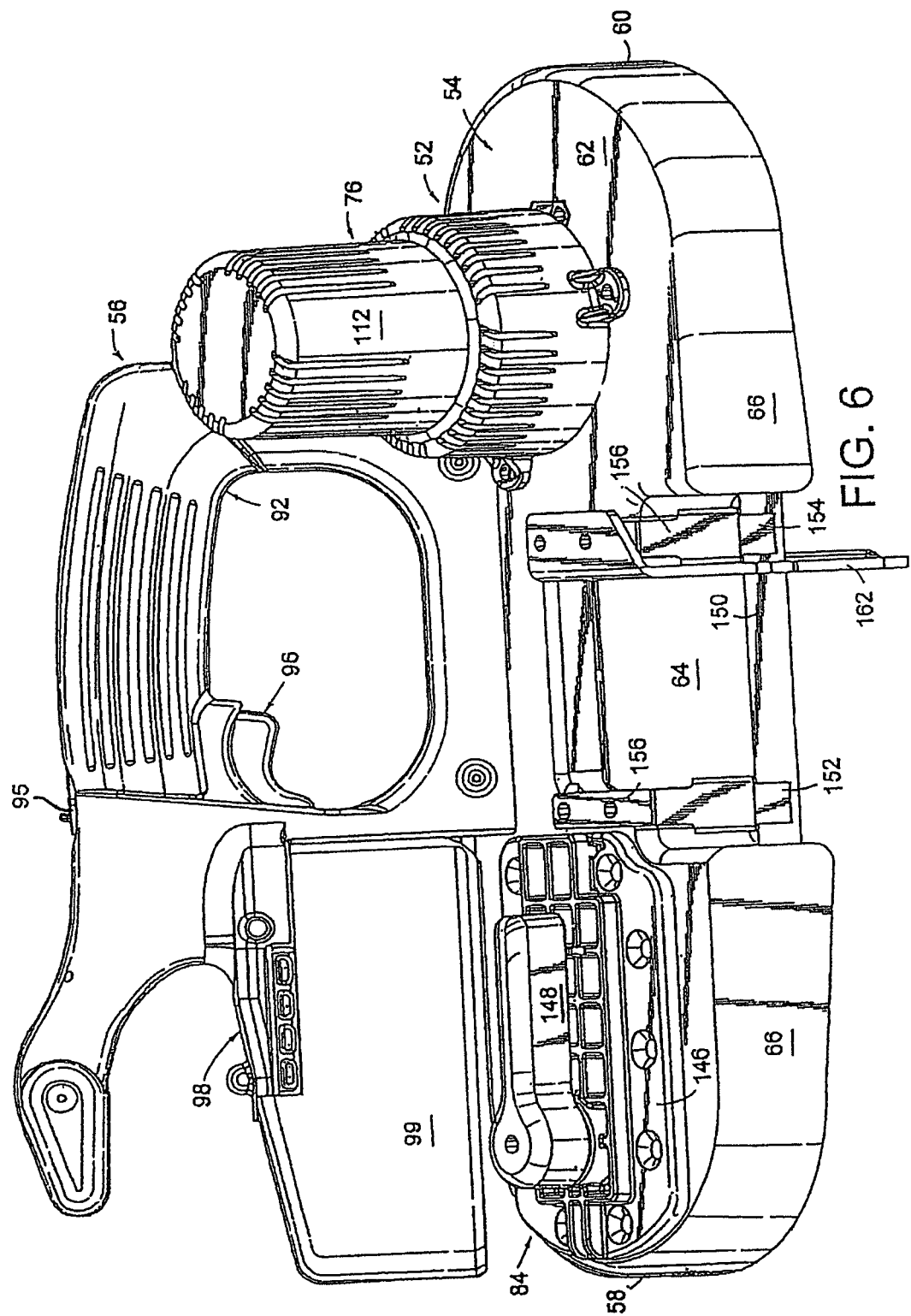
FIG. 6 is an opposite side elevation view of the invention shown in FIG. 5.
Figure 7:
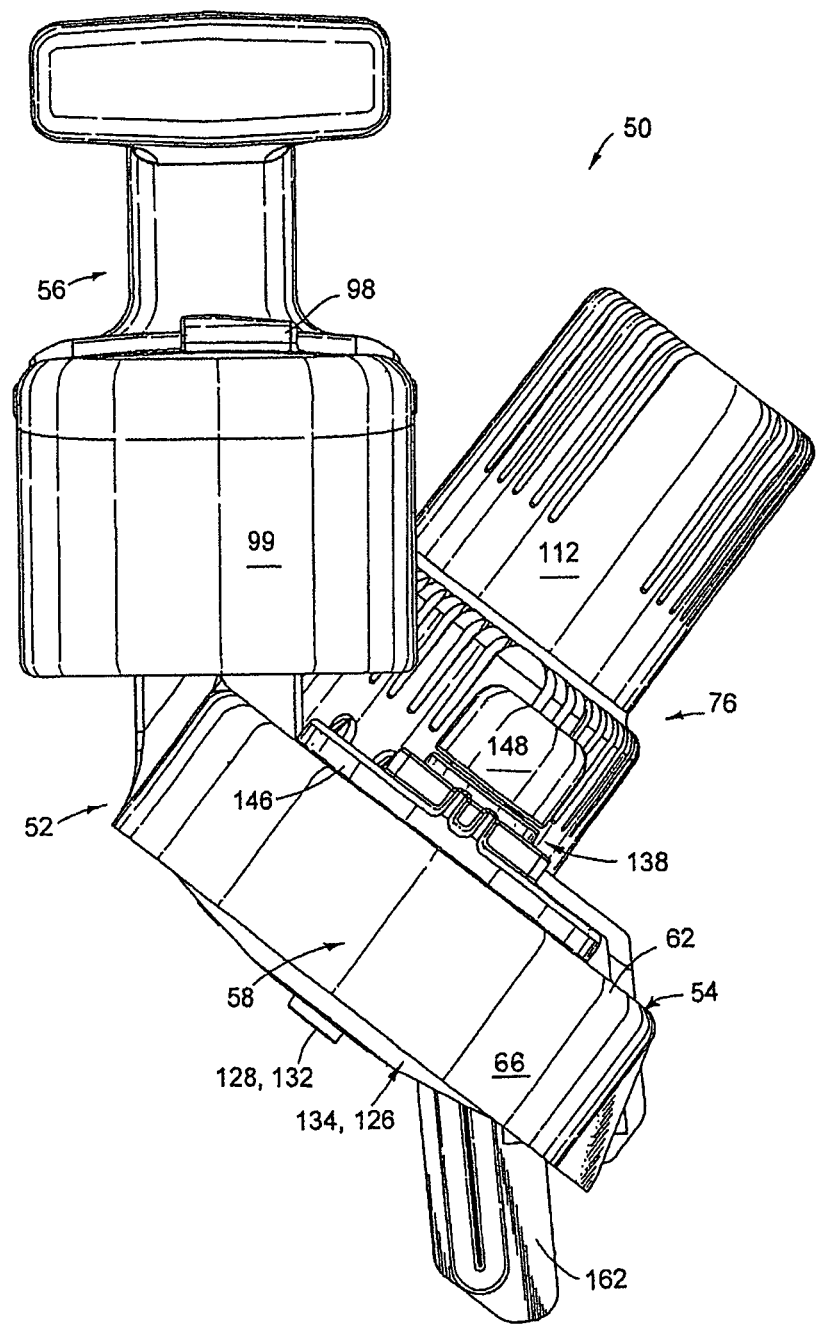
FIG. 7 is an end elevation view of the invention shown in FIG. 6.
Figure 8:
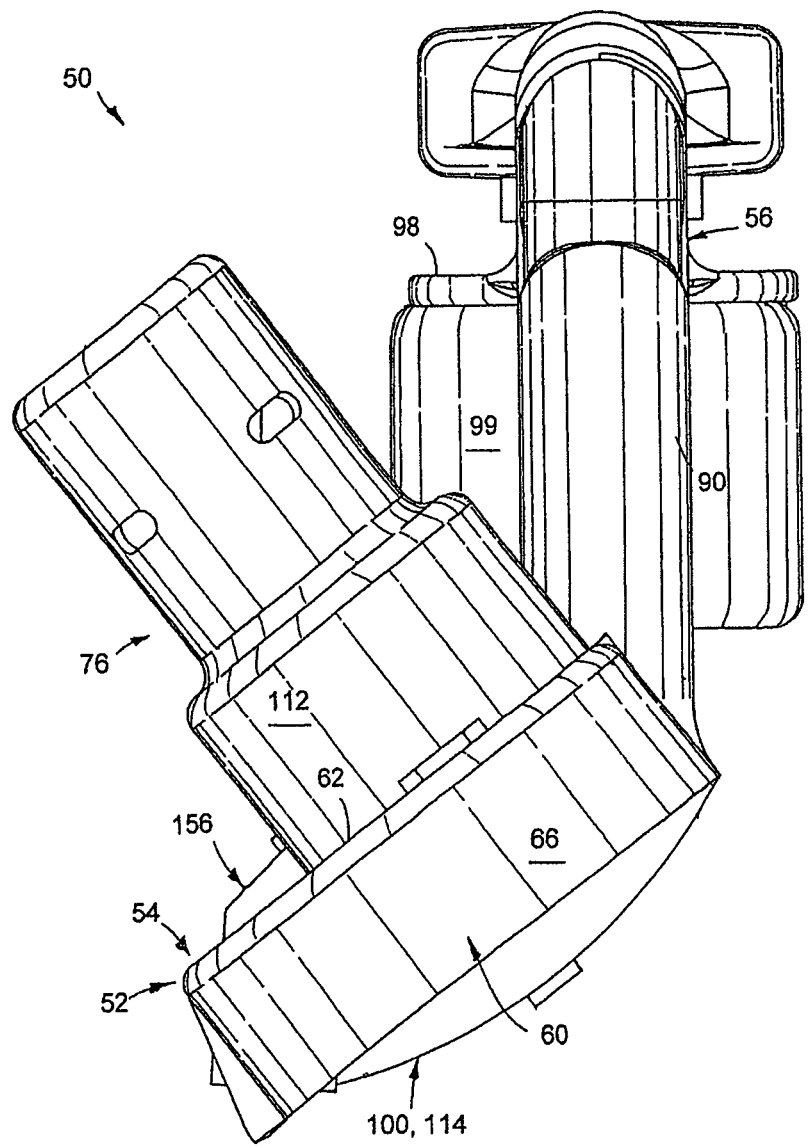
FIG. 8 is an opposite elevation view of the end invention shown in FIG. 6.

The handle assembly 92 also includes a slide receiver 98 for receiving a battery 99 thereon (FIG. 5). In the preferred embodiment, the battery receiver 98 is positioned at an end of the handle assembly 92 opposite that proximate the motor assembly 76 described below to balance the weight distribution as much as possible. This may be accomplished by altering the moment or length of the battery receiver 98 relative to the handle assembly 92. Anyone of a number of different locking mechanisms may be used to keep the battery 99 on the receiver.

Mounted to the deck 62 of the chassis 52 is the motor assembly 76 briefly described earlier. As better shown in FIG. 9b, the motor assembly 76 is what drives a drive wheel assembly 100 positioned below deck 62. The motor assembly 76 includes a bracket 102 attached to the underside of deck 62 and provides a mounting base for fixing the motor assembly 76 to the chassis 52. The motor assembly 76 also includes a motor 104 attached to a reduction gear transmission 106 which is mounted to the bracket 102. The transmission 106 includes an output shaft 108 fixed to a gear 110. Once the motor assembly 76 is fixed to the bracket 102, the motor assembly cover 112 is slipped over motor 104 and transmission 106 and coupled to the upper surface of deck 62.

The drive wheel assembly 100 briefly mentioned above includes a drive wheel 114 having an internal gear 116 formed around the interior of the wheel hub and adapted to engage gear 110 fixed to output shaft 108. The pitch or tooth count of internal gear 116 is preferably greater than that of gear 110 even though the reduction of output shaft 108 has been substantially reduced from the rpm output of the motor 104. More specifically, the gear ratio between internal gear 116 to gear 110 is to drive wheel 114 at a speed to obtain the best cutting solution. The drive speed of wheel 114 may be controlled using other methods to obtain the best performance. Examples of alternate methods and structures would include variable speed motor, different gear ratios between the internal gear 116 and gear 110, and a clutch arrangement between the output shaft 108 and drive wheel 114. However, in this embodiment it is preferred the drive wheel 114 be journaled to a post 118 extending from bracket 102, and fixed by a cap screw or other fastener 120 and appropriate spacers/washers 122. When journaled on post 118, internal gear 116 is spaced appropriately from drive gear 110 to cause drive wheel 114 to spin in a counter clockwise direction.

A driven wheel assembly 124 mounted toward the opposite end of the chassis 52 includes a pulley or wheel 126 journaled to a post 128 extending from the carriage 130 of the tensioning assembly 84 disposed in sliding position within the generally rectangular recess 78. A fastener 132 and spacers/washers 134 are used to retain the driven wheel 126 in free spinning engagement on the tensioning assembly 84.

The driven wheel 126 can be rotated or otherwise translated between a first and a second position relative to the drive wheel 114 through the tensioning assembly 84 located at one end of the saw. The tensioning assembly 84 includes the carriage 130 resting within the rectangular recess 78. The post 128 extends through the oval slot 82 formed in the recess floor 80 in order to receive the driven wheel. The carriage 130 also includes a structure 136 at one end which is intended to stabilize the relative position of one end of a compression spring or other biasing mechanism 138. The opposite end of the biasing mechanism 138 engages the wall 140 of opening 78 in order to urge carriage 130 toward the opposite end. The position of the carriage 130 may be changed with the aid of a cam pin 142 extending from cam shaft 144. The cam shaft 144, carriage 130 and biasing mechanism 138 are retained within the recess 78 by a cover plate 146 which is fastened to deck 62, and contains a port through which the upper end of cam shaft 144 extends to be attached to a cam handle 148. Rotation of the cam handle 148 rotates cam shaft 144 and engages or disengages the cam pin 142 with carriage 130 and translating the carriage 130 toward or away from the biasing mechanism 138.

As suggested in the foregoing text, the saw of this invention is a hand-held band saw. In a preferred embodiment, the continuous loop blade 150 may be changed to accommodate substantially any material ranging from steel or iron, plastics, or woods. The distance between the drive wheel and driven wheels is reduced by adjusting the biasing mechanism 138. The desired blade is placed at least partially around the drive and driven wheels and the biasing mechanism 138 is released to place the blade in tension. To properly orient the section of the continuous loop blade 150 at the proper angle as it traverses throat 64, bearings 152 and 154 are mounted at the distal ends of brackets 156 to engage the side of the blade 150. Although not shown, spacers may be used to adjust the position of the bearings 152 and 154. The brackets 156 are preferably "dog-legged" at a predetermined angle such that the bearings 152, 154 at the end engage opposite sides of the continuous loop blade and deflect the section of the blade 150 traversing the throat to the desired angle. In the preferred embodiment, the angle of the blade 150 traversing the throat may be substantially parallel to the plane of the handle assembly 92.

In one embodiment of the invention, provision is made to break worn-out or defective blades in order to reduce the risk of injury to a user as a result of the weakened blade. This is accomplished with the aid of a blade break assembly 160 mounted to the underside of deck 62 just ahead of the up-take portion of the drive wheel 114. In cases where a worn or cracked blade is running on the invention, the blade will tend to wander over the surface of the drive and driven wheels in large part because of a minor change in the blade length. As the blade migrates, it will eventually engage the blade break assembly before a substantial portion of the toothed edge of the blade exceeds the height of the skirt 66. When the blade engages the break, the worn portion is stressed by the break 160 more than any other section and leading to an intentional failure. It is envisioned the blade break 160 may assume different configurations. In one embodiment, the blade break may take the form of a bearing mounted on a post positioned to engage the cutting edge of the blade as it migrates from the wheels. Other structures may also be used to intentionally stress the blade and cause it to release to prevent any injury or damage.

Another aspect of the invention includes a fence 162 extending from one side of the throat 64 to aid the user in stabilizing the saw and making a more precise cut. In a preferred embodiment of the invention, the angle the fence extends downwardly from deck 52 is substantially parallel to the orientation of the blade section traversing the throat and the plane of the handle.

As suggested earlier in this description, an important object of the invention is providing the capability of the cutting power of a band saw literally in one hand of a user. With this invention, the user can easily carry the saw to essentially any location to cut certain types of stock to length. The invention was originally intended to cut metal conduit but it can easily be adapted to cut other material. In order to function as desired, the only limitation is that the stock should fit within the throat area. In most instances, it is envisioned the user will grasp the saw in one hand and position or stabilize the stock with the other hand. The user will depress the safety switch and then depress the trigger to turn on the saw. The user may pre-align the blade before starting the cut, or align the blade after starting the blade rotation to initiate the cut. To stabilize the stock or work piece, the user can rest the stock against the fence while the blade is cutting the stock.

In operation, the instant invention is used in a manner which is ergonomically much more natural than prior band saws. First the operator is able to easily hold the saw using a single hand rather than prior band saws where the handle is positioned at an extreme end of the saw body. This one-handed operation is not merely attributable to scale, but to the position and orientation of the handle assembly along the upper end of the saw so the user can keep the saw close to the user's body as compared to previous devices requiring support away from the user's body. Moreover, an offset of the mass of the motor assembly by the mass of the battery pack naturally orients and balances the saw in an appropriate and ergonomically comfortable position. This aspect also naturally orients the throat area 64 of the saw to engage the work piece.

The method of using the inventive saw having a throat along one edge for receiving the work piece and traversed by a continuous loop blade includes grasping the handle extending from an upper edge of the saw opposite the throat area with one hand. The user is then free to orient or stabilize the work piece with the other hand. The user may also fix the work piece with clamps or the like before hand without the need to later stabilize the free hand. The user activates or energizes the saw by first depressing the safety switch disposed in the handle assembly, and then depressing the trigger also located in the handle assembly. This provides power to the motor and results in rotation of the continuous loop blade to pass through the throat area. The user is then able to engage the work piece by the blade to make the cut. To help in the cutting operation, the user can permit the work piece to be restrained by the fence to make a better cut. Because of the position of the center of gravity is generally in a line passing through the user's hand and forearm, the user is able to easily orient the saw to make cuts in a vertical or overhead position. This alignment of the center of gravity is closer to the axis of the user's forearm and hand making it more ergonomic to control. This also frees the second hand of the user to orient, adjust or stabilize the position of the work piece to complete the cut in a smooth and efficient manner.

The method of using the instant invention also includes the manner for driving the continuous loop blade. The motor assembly 76 described above includes a reduction gear attached to one end of the motor. As suggested by the component name, the reduction gear or transmission changes the rotational speed of the output shaft from the rotational speed of the motor. In this particular application, the rotational speed produced by the transmission is less than that of the motor. The gear 110 attached to the end of the transmission engages the internal gear 116 on the interior of the drive wheel 114. The gear ratios are such that the desired blade speed is achieved. If desired, a variety of gear combinations can be provided using different reduction combinations. Alternatively and as anticipated in one form of the invention, the speed of the cutting blade can be varied using a variable speed trigger assembly as is used in other tools.

Modifications in addition to those outlined above may occur to those skilled in the art or to those who make or use the invention. Such modifications may include substitution of the battery with a power cord for connecting to an AC source. The change in power source will also require a change in the electrical components so they are compatible. Other modifications may change the blade tensioning mechanism from one that is naturally relaxed to one that is naturally in the extended position. Additional modifications to the instant invention may also include the ability to quickly adjust the deflection angle of the continuous loop blade. The range of adjustment may vary from small adjustments to much larger scale changes. One example for doing so may be by providing a pivoting arm on the guide assembly or bracket 156 such that the angle of the bearings may be adjusted. This may be advantageous if the center of gravity is altered by using batteries of different mass or the user wishes to increase the depth of the throat area by changing the natural cutting angle of the saw. Thus the embodiment described above is merely illustrative.

What is claimed is:

1. A portable hand-held band saw capable of being fully supported and operated single-handedly for performing a one-handed cutting operation using a closed loop saw blade, comprising:

a substantially planar frame having a first end and a second end for housing a first drive wheel with a first rotational axis at the first end and a second driven wheel with a second rotational axis at the second end, wherein the drive wheel and the driven wheel engage the closed loop saw blade, said substantially planar frame defining a first plane;

a throat within the frame, said throat being able to receive a workpiece, wherein the throat exposes a portion of the closed loop saw blade angled within the throat;

the exposed portion of the angled saw blade defining a second cutting plane which is different from, and at an angle to, the first plane of the substantially planar frame;

a drive assembly mounted to the band saw;

a handle assembly extending upwardly and outwardly at an angle from the plane of the frame, said handle assembly including at least a part of a hand grip portion located between the first axis of the drive wheel and the second axis of the driven wheel;

said handle assembly permitting the operator to lift and operate the saw with one hand, and said handle assembly being located such that the saw is substantially weight balanced, so that the saw can be utilized in a single-handed operation for cutting the workpiece while holding the workpiece with another hand of the operator;

wherein the handle assembly defines yet a third plane that is substantially parallel to the second cutting plane of the saw blade, this third handle plane being positioned outwardly from the second cutting plane; and a trigger within the hand grip portion, said trigger capable of being activated by the operator while operating the saw single-handedly, and wherein the trigger is also located between the first drive wheel axis and the second wheel axis.

2. The saw as defined in claim 1, further comprising a first and a second blade guide mounted on opposite sides of said throat for twisting a segment of the continuous loop blade to a predetermined angle, which defines the second cutting plane orientation.

3. The saw as defined in claim 1, wherein said handle assembly extends upwardly and outwardly from the frame at an acute angle.

4. The band saw as defined in claim 1, further comprising a rechargeable battery.

5. The band saw according to claim 1, further comprising a fence extending from the frame for resting against a work piece being cut.

6. The band saw of claim 1, wherein the handle assembly provides the only hand grip portion useable during operation of the saw.

7. A portable hand-held band saw capable of being fully supported and operated by hand for performing a cutting operation using a closed loop saw blade, comprising:

a substantially planar frame having a first end and a second end for housing a first drive wheel with a first rotational axis at the first end and a second driven wheel with a second rotational axis at the second end, wherein the drive wheel and the driven wheel engage the closed loop saw blade, said substantially planar frame defining a first plane;

a throat within the frame, said throat being able to receive a workpiece, wherein the throat exposes a portion of the closed loop saw blade angled within the throat;

the exposed portion of the angled saw blade defining a second cutting plane which is different from, and at an angle to, the first plane of the substantially planar frame;

a drive assembly mounted to the band saw;

a handle assembly extending upwardly and outwardly at an angle from the plane of the frame, said handle assembly including at least a part of a hand grip portion located between the first axis of the drive wheel and the second axis of the driven wheel;

said handle assembly permitting the operator to lift and operate the saw with one hand, and said handle assembly being located such that the saw is substantially weight balanced, so that the saw can be utilized in a single-handed operation for cutting the workpiece while holding the workpiece with another hand of the operator;

wherein the handle assembly defines yet a third plane that is substantially parallel to the second cutting plane of the saw blade, this third handle plane being positioned outwardly from the second cutting plane; and a trigger within the hand grip portion, said trigger being positioned between the first and second rotational axes of the wheels, said trigger capable of being activated by the operator while operating the saw.

8. The saw as defined in claim 7, further comprising a first and a second blade guide mounted on opposite sides of said throat for twisting a segment of the continuous loop blade to a predetermined angle, which defines the second cutting plane orientation.

9. The saw as defined in claim 7, wherein said handle assembly extends upwardly and outwardly from the frame at an angle of from approximately 35 to 60 degrees, and preferably about 45 degrees.

10. The band saw as defined in claim 7, further comprising a rechargeable battery selected from the group of nickel cadmium, nickel metal hydride, lithium, and lead-acid batteries.

11. A band saw according to claim 7, further comprising a fence extending from the frame for resting against a work piece being cut.

12. The band saw of claim 7, wherein the distance between the handle assembly and the saw blade is greater than the distance between the two planes of the cutting plane defined by the saw blade extending across the throat and the handle assembly plane.

13. The band saw of claim 7, wherein the handle assembly provides the only hand grip portion useable during operation of the saw.

* * * * *